Sept. 18, 1923.
B. F. HAMILTON
NUT TAPPING MACHINE
Filed March 8, 1922 — 5 Sheets-Sheet 1
1,468,501
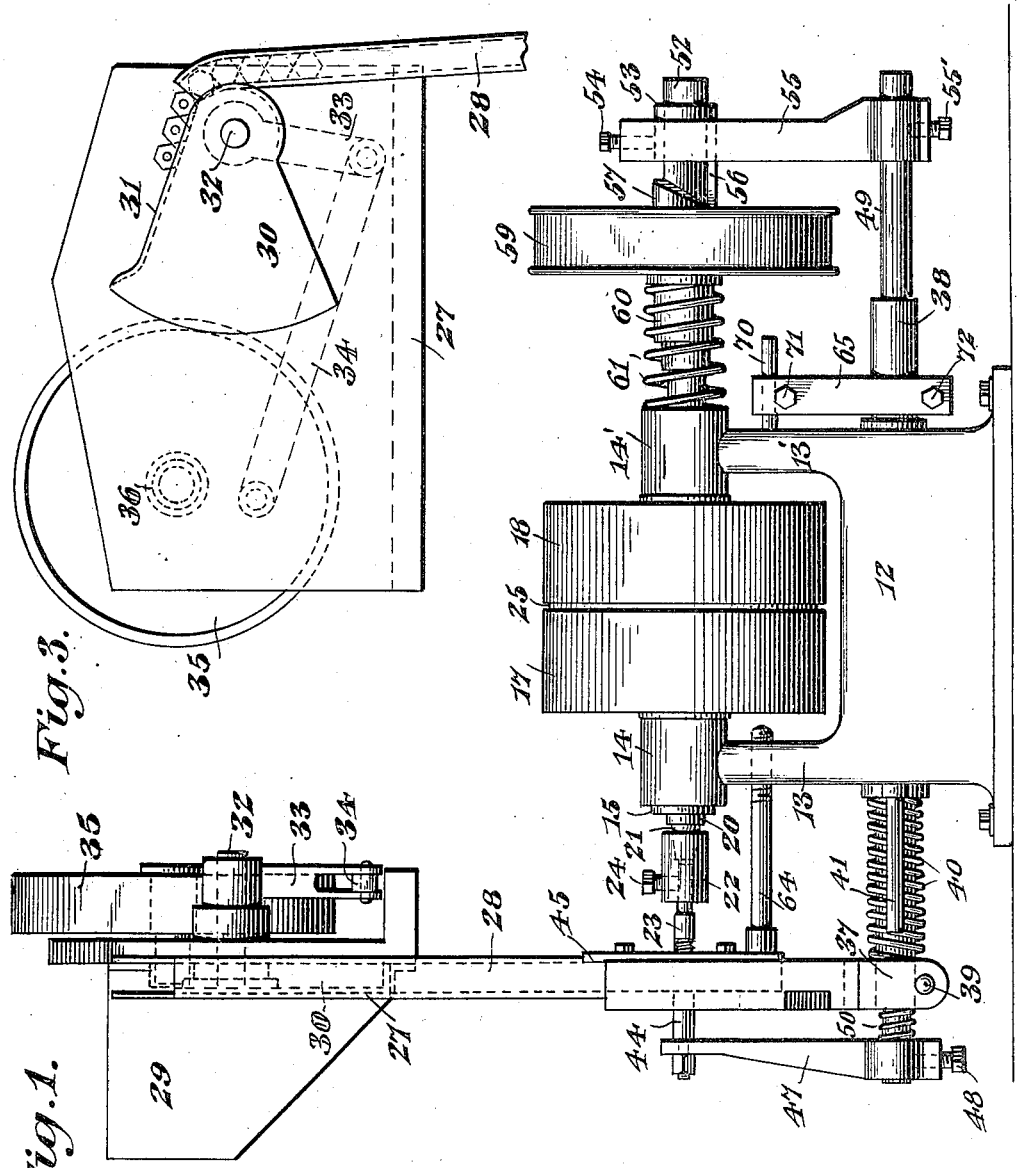
Bertis F. Hamilton, INVENTOR.
BY Geo. P. Kimmel, ATTORNEY.

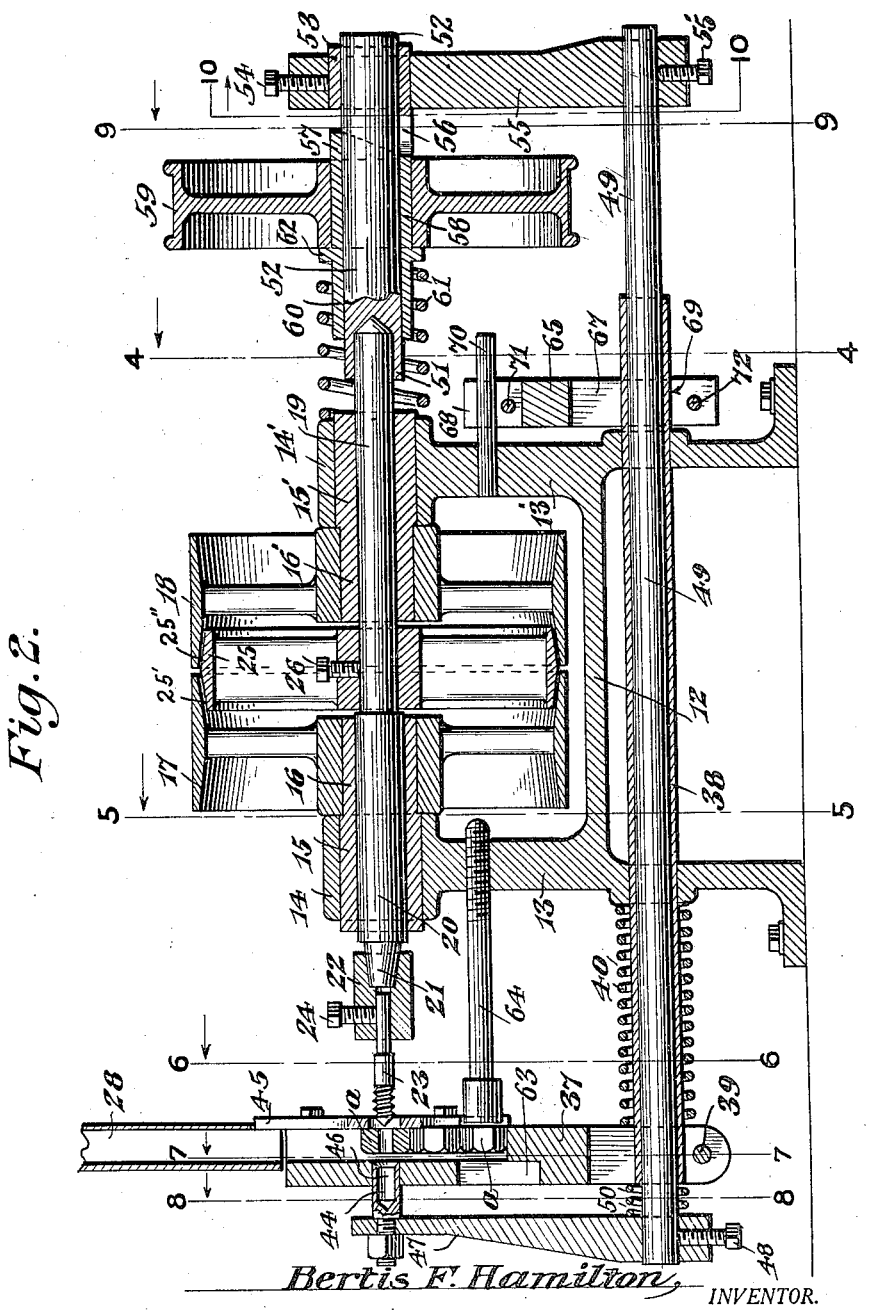

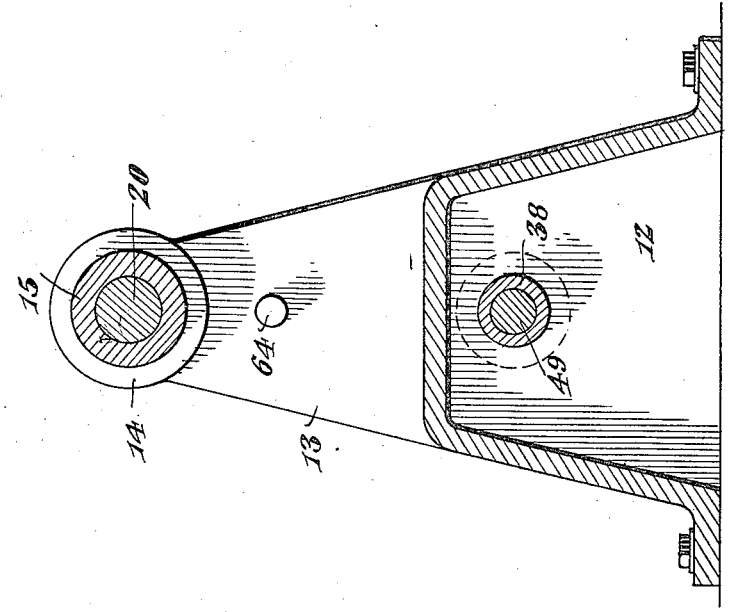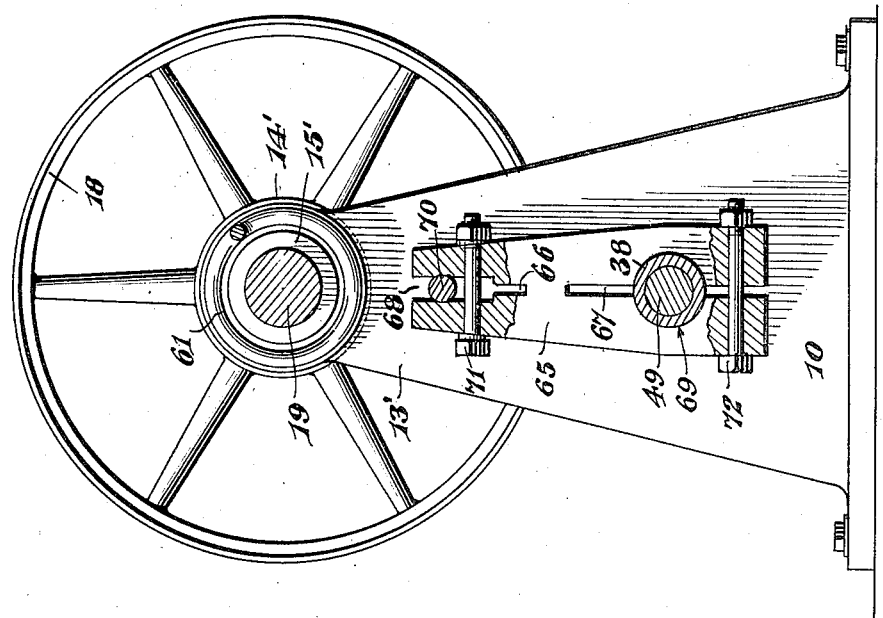

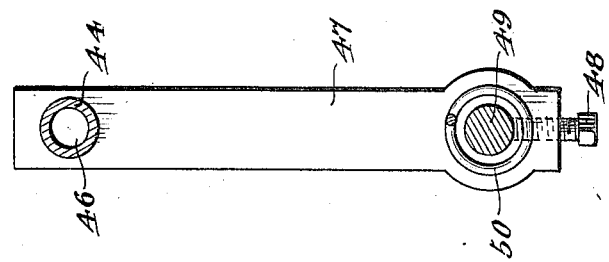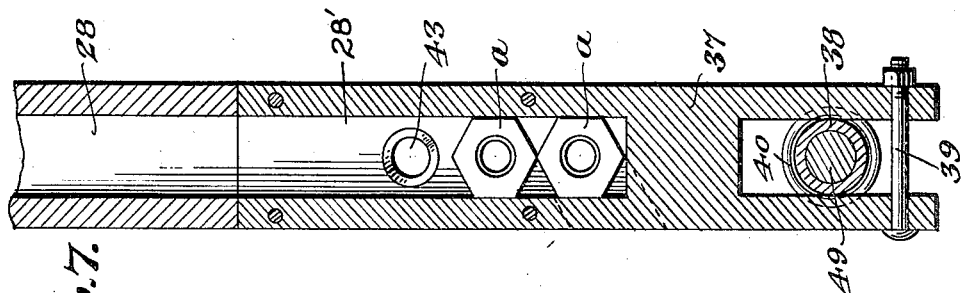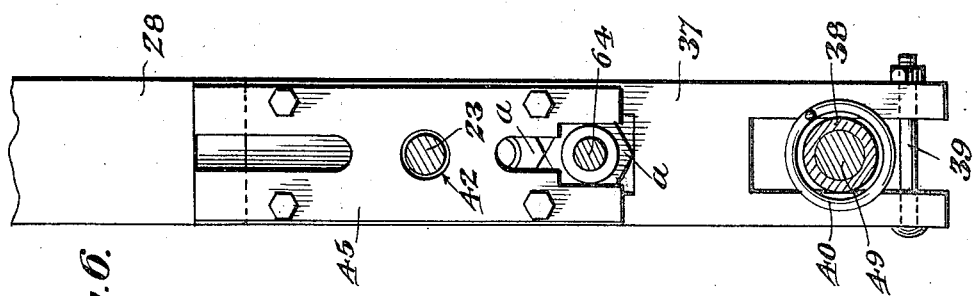

Sept. 18, 1923.
B. F. HAMILTON
NUT TAPPING MACHINE
Filed March 8, 1922
1,468,501
5 Sheets-Sheet 5
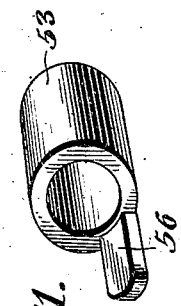
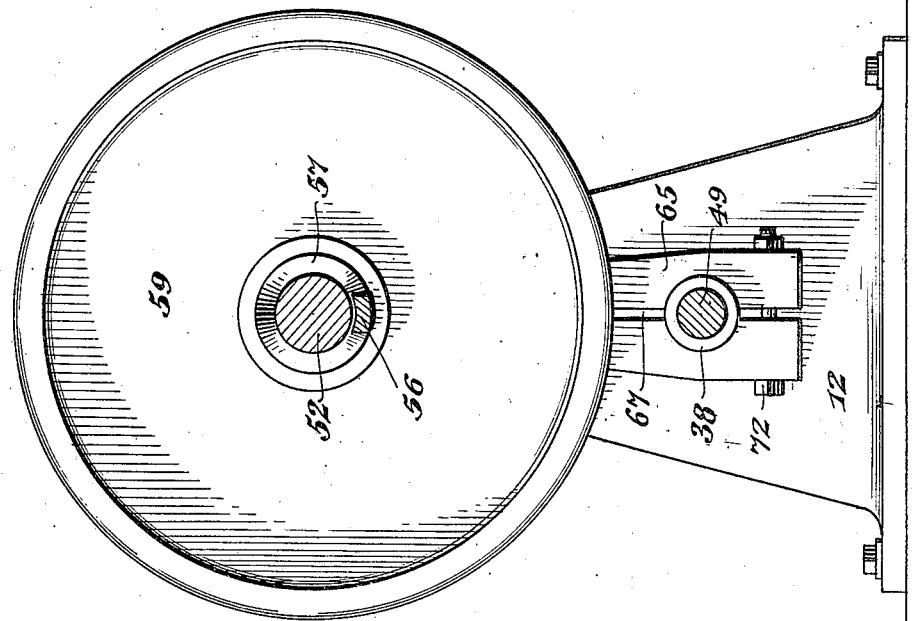
Bertis F. Hamilton, INVENTOR.
BY Geo. P. Kimmel ATTORNEY.

Patented Sept. 18, 1923.

1,468,501

UNITED STATES PATENT OFFICE.

BERTIS F. HAMILTON, OF FLINT, MICHIGAN.

NUT-TAPPING MACHINE.

Application filed March 8, 1922. Serial No. 541,992.

*To all whom it may concern:*

Be it known that I, BERTIS F. HAMILTON, a citizen of the United States, residing at Flint, in the county of Genesee and State of Michigan, have invented certain new and useful Improvements in Nut-Tapping Machines, of which the following is a specification.

This invention appertains to improvements in nut tapping machines, and has for its principal object to provide an automatic machine of this type wherein the tapping operation will be readily accomplished with accuracy on a plurality of nuts successively fed to the tapper bit without the necessity of making use of a timing mechanism ordinarily resorted to in such operations.

With the foregoing and other objects in view, the invention resides in the certain new and useful construction, arrangement and operation of parts as will be hereinafter more fully described, set forth in the appended claims, and illustrated in the accompanying drawings, in which:—

Figure 1 is a side elevation of a preferred embodiment of the machine.

Fig. 2 is a vertical longitudinal section thereof,

Fig. 3 is a side elevation of the magazine or hopper casing for holding a supply of nuts and showing the manner of feeding the same therefrom, Fig. 4 is a vertical transverse section taken on the line 4—4 of Fig. 2, Fig. 5 is a vertical transverse section taken on the line 5—5 of Fig. 2, Fig. 6 is a vertical section taken on the line 6—6 of Fig. 2, Fig. 7 is a vertical transverse section taken on the line 7—7 of Fig. 2, Fig. 8 is another vertical sectional view taken on the line 8—8 of Fig. 2, Fig. 9 is a further vertical transverse sectional view taken on the line 9—9 of Fig. 2, Fig. 10 is a similar vertical transverse section taken on the line 10—10 of Fig. 2, and, Fig. 11 is a perspective view of one of the cam members for effecting the feed of the articles to and from the tapper bit during successive operations of the same.

Referring to the drawings, wherein similar characters of reference designate corresponding parts throughout the several views thereof, 12 indicates a cast metal base of the machine, having standards 13, 13', rising from its opposite ends and formed at their upper ends to provide journals 14, 14', respectively, in which are fitted bearing sleeves 15, 15', having opposed inwardly extending portions 16, 16', of a slightly reduced exterior diameter to receive thereon for free rotation a pair of pulleys 17 and 18, the pulley 17 to be suitably driven for rotation in an anti-clockwise direction, and the pulley 18 for rotation in a clockwise direction. Journaled in the bearing sleeve 15' is a shaft or spindle 19, having an enlarged forward end portion 20 supported in the bearing sleeve 15, the forward projected end portion of the enlarged portion 20 thereof being formed to provide a tapered end portion 21 on which is secured a chuck 22 having an axial bore for the reception therein of a tapper bit 23, the latter being held in operative position by means of a set screw 24. Mounted on the shaft or spindle 19, at a point between the opposed ends of the reduced inner end portions 16 and 16', of the bearing sleeves 15, 15', is a friction clutch wheel 25, the same being secured for rotation with the shaft 19, by means of a set screw 26, and is normally disposed in unclutched relation with respect to the pulleys 17 and 18. This clutch wheel 25 has its peripheral face oppositely bevelled as at 25' and 25'', and these bevelled faces are arranged to alternately engage and disengage with and from correspondingly bevelled faces formed on the adjacent under sides of the pulleys 17 and 18, as will be hereinafter more fully explained.

Mounted at a distance from one end of the machine is a nut feed mechanism, which comprises a casing 27, having a downwardly extending chute portion 28, and a supply hopper 29 disposed at one side of its upper end. Carried within the casing 27 is a feed device 30 of substantially segmental form, having a grooved upper edge 31 arranged to receive thereon a plurality of nuts from the hopper 29, the nuts taking a position on edge within the groove 31, so as to be discharged from the open end of the latter, when the device or segment is operated for the purpose. For imparting the necessary oscillatory or rocking movement to the feed device or segment 30, the same is mounted on a shaft 32, journaled in the walls of the casing 27, and is provided with an arm 33 having its free end pivoted to one end of a pitman 34, which, in turn, has its other end eccentrically connected to one side of a pulley 35, the latter being carried on a shaft 36 also journalled in the walls of the casing 27. The pulley 35 is power driven, and each of its revolutions rocks the segment 30 in a manner that on the upward movement of the latter, a number of the nuts are picked up by the upper grooved edge of the segment and those which engage on edge within the groove 31 remain in such position, while the others drop back into the hopper. When the full upward position of the segment 30 is reached, the inclination of the upper edge thereof is such that the nuts, engaged in the groove 31, are discharged outwardly of the open end of the groove and into the chute 28, where they feed by gravity to the positions for the tapping out of their bores by the tapper bit 23.

For effecting the tapping out of the bores of the nuts a, in successive operations, the casing 27, together with the chute 28 and the hopper 29, is moved bodily toward and from the tapper bit 23, and for such purpose, the lower end portion 28′, of the chute 28, is bifurcated as at 37, to straddle one end of a sleeve 38, formed of a suitable length of tubular stock, and extending longitudinally through the base 12, and is loosely secured thereon by means of a bolt 39 passed through the lower ends of the bifurcations 37. The casing 27 in its entirety is normally positioned at the outer projected end of the sleeve 38 by means of a compression spring 40, encircling the end of the sleeve and interposed between the bifurcated end 37 of the chute 28 and the opposed end wall of the base 12. For limiting the inward movement of the casing 27 toward the adjacent end of the base, during each tapping operation, a stop rod 41 is threaded into the end of the base, and has its free end disposed directly in the path of the bifurcated end 37, of the chute 28, and to one side of the sleeve 38. Formed in the inner wall of the chute 28 is an opening 42, which is disposed directly in line with the tapper bit 23, and with which the bores of the nuts are successively alined for the tapping out of the same by the tapper bit 23, when the chute 28 is moved toward the latter and the free end thereof passes inwardly of the opening 42 and into engagement with the bore of the nut presented to the same. Formed in the opposite or outer wall of the chute 28 is a second opening 43, arranged in line with the opening 42, and in the same is projected a nut retaining member or presser foot 44, which is arranged to move inwardly of the opening 43 and press against the nut positioned at the moment in front of the opening 42, and holds the nut firmly against the inner wall of the chute 28, on the removable base plate 45 thereof, during the entire tapping operation. The member or foot 44 is provided with an axial bore 46 to admit of the free end of the tapper bit 43 passing entirely through the bore of the nut being operated on. The presser member or foot 44 is removably supported in the upper end of an arm 47, secured, by means of a set screw 48, on the free end of an actuating rod 49, which is slidably mounted in the sleeve 38 and through which it extends to a point beyond the rear end wall of the base 12. The presser foot or member 44 is held normally out of contact with a nut disposed within the chute 28, or from a position in the path of the nuts feeding down to the latter, by means of a compression spring 50 carried on the end of the rod 49 and interposed between the connected end of the arm 47 and the bifurcated end 37 of the chute 28.

For actuating the casing 27, in its entirety, and the nuts carried in the chute 28 thereof, toward and away from the tapper bit 23, the rear end of the shaft or spindle 19 is projected outwardly of the bearing sleeve 16′ at the rear end of the machine, and this end of the shaft 19 is engaged in a socket 51 formed axially of the adjacent end of a stub shaft 52, which is supported in a bearing sleeve 53, secured, by means of a set screw 54, in the upper end of an arm 55, which is carried on the rear end of the rod 49, and secured thereto by means of a set screw 55′. The bearing sleeve 53 is formed to provide a forwardly projecting cam portion 56 cooperative with a cam portion 57 formed on a sleeve 58 carried on the stub shaft 52, and within the confines of the hub of a pulley 59. The pulley 59 is secured on the cam sleeve 58 for joined rotation therewith, and is driven by means of a belt connection to a suitable source of current, and formed to provide a hub extension 60 having an axial bore directly encircling the stub shaft 52 forwardly of the abutting end of the cam sleeve 58 disposed within the hub proper thereon. The cam portion 57, of the sleeve 58, is normally tensioned in the full operative engagement with the cam portion 56 of the bearing sleeve 53, by means of a compression spring 61 encircling the connected end portion of the shaft or spindle 19 and the stub shaft 52, and interposed between the rear end of the bearing portion 14′, of the standard 13′, and the opposed shouldered portion 62 of the pulley 59. The arm 55 depends from the stub shaft 52 and has its lower end provided with a circular opening engaged over the inner or rear end of the rod 49 and is secured thereto by means of a set screw 55′.

In the operation of the machine as thus constructed and arranged, and assuming that the pulley 17 is being driven in an anti-clockwise direction, the pulley 18 in a clockwise direction, and the pulley 59 in either one or the other of such directions, and the clutch wheel or member 25 disposed in neutral position between the pulleys 17 and 18, the initial movement of the cam 57 against the opposed surface of the cam 56, from the positions thereof as shown in Fig. 2, forces the arm 55 outwardly and consequently exerts a pull on the rod 49, which moves rearwardly through the sleeve 38 and draws the arm 47 toward the chute 28. With the movement of these parts as stated, the presser member or foot 44 moves inwardly of the opening 43, in the front wall of the chute 28, and forces against the opposed surface of the nut to hold the latter whereby its opening will be in alignment with said opening 42, and so that the nut is firmly held in position during the tapping operation to follow.

This movement of the arm 47 and the presser member or foot carried thereby, also acts to place the spring 50 under compression against the lower bifurcated end 37 of the chute 28, and, when this spring 50 is fully compressed, further movement of the cams 56 and 57 forces the arm 55 further in a rearward direction, and the result of the continued pull on the rod 49 causes the casing 27, including the chute 28 in the hopper 29 thereof, to move bodily toward the front end of the machine proper. This movement of the chute 28, starts to place the spring 40 under compression, and causes the bore of the nut held by the presser foot or member 44 to engage with the forward end of the tapper bit 23, whereby, during the continued movement of the cams 56 and 57, the pulling movement of the rod 49 on the arm 47, and the hopper casing chute 28 increases the pressure of the nut against the ends of the tapper bit 23 to the extent of causing the shaft or spindle 19, 20, to move rearwardly, when the clutch 25 will engage with the pulley 18 for the rotation of the shaft 19, 20, and the tapper bit 23 in a clockwise direction, the proper direction for the tapping out or screw threading of the bore of the nut with which the tapper bit 23 has been previously engaged. This tapping or screw threading operation is completed, just before the high point on the cams 56 and 57 is reached, when the further threading movement of the tapper bit 23 into the nut engaged thereby will pull the shaft 19, 20 in a forward direction, placing the spring 61 under tension, and moving the clutch 25 out of engagement with the pulley 18 and into engagement with the pulley 17, which movement is accomplished at the extreme high point of the cams 56, 57, and the shaft 19, 20 will now be rotated in the anti-clockwise direction, whereby the tapper bit 23 unscrews from the now fully threaded bore of the nut, and, in the meantime, the chute 28 is being forced outwardly to normal position, and likewise the presser arm 47, and the nut engaging foot carried thereby, by reason of the expansion of the springs 40 and 50, which are now free for such expanding action by reason of the passing of the high points of the cams 56, 57. The spring 61 compensates for the lateral play of the cam 57, obtaining when the chute 28, of the feed magazine or casing 27 abuts the end of the stop 41 at the completion of the actual threading or tapping operation of the tapper bit, and during the threading engagement of the tapper bit with the work for pulling the shaft 19, 20, in the forward direction to effect the reversed direction of rotation of the latter and the bit 23.

During the tapping operation, the lowermost of the nuts previously tapped out, is discharged outwardly of the lower end of the chute 28 through an opening 63, and this is accomplished by means of an ejector rod 64 extending forwardly of the front standard 13 of the base 12, in the path of the opening 63, which it enters during the feeding movement of the chute 28. The end of the sleeve 38 projecting rearwardly from the base 12, is provided with a stop member 65, which is vertically slotted inwardly of its upper and lower ends as at 66 and 67, and bifurcated at its extreme upper end, as at 68, and provided with a circular opening 69 inwardly of its lower end, whereby to straddle a guide rod 70 on the one hand, and to clamp around the sleeve 38 on the other hand, substantially as is shown, suitable bolts 71 and 72 being passed through the upper and lower bifurcated ends 68 and 69, respectively, for the setting of the stop 65 correspondingly for different lengths of tapping or threading operations. For the tapping out of the bores of various sizes of nuts, a tapper bit of a proper size will be inserted into the chuck for the purpose, while the range of movement of the parts of the machine will be corresponding set by adjusting the ejector rod 64 with respect to the discharge end of the chute 28, and similarly adjusting the stop member 69 on the sleeve 38.

From the foregoing, it will be readily apparent that, while a preferred embodiment of the machine has been described and illustrated herein in specific terms and details of construction, arrangement and operation, various changes in and modifications of the same may be resorted to without departing from the spirit of the invention, or the scope of the claims appended hereto.

Having thus fully described the invention, what is claimed is:—

1. A nut tapping machine comprising a bodily shiftable work holder provided with means for the gravity feed of the work to be operated on, a longitudinally shiftable tapper bit operating shaft shiftable rearwardly by said work holder, a longitudinally shiftable supporting shaft mounted on the rear end of said bit operating shaft, a spring controlled work holder shifting mechanism having an element thereof extending into the holder for holding the work therein in position to be operated on and for shifting the holder to and from said bit operating shaft, means cooperating with said bit operating shaft for driving it in an anti-clockwise direction when shifted forwardly by the engagement of the bit with the work and in a clockwise direction when shifted rearwardly by said holder, and means mounted on said supporting shaft for operating said shifting mechanism to move the holder towards the bit operating shaft and further to provide for the holder shifting the shaft rearwardly.

2. A nut tapping machine comprising a bodily shiftable work holder provided with means for the gravity feed of the work to be operated on, a longitudinally shiftable tapper bit operating shaft shiftable rearwardly by said work holder, a longitudinally shiftable supporting shaft mounted on the rear end of said bit operating shaft, a spring controlled work holder shifting mechanism having an element thereof extending into the holder for holding the work therein in position to be operated on and for shifting the holder to and from said bit operating shaft, means cooperating with said bit operating shaft for driving it in an anti-clockwise direction when shifted forwardly by the engagement of the bit with the work and in a clockwise direction when shifted rearwardly by said holder, means mounted on said supporting shaft for operating said shifting mechanism to move the holder towards the bit operating shaft and further to provide for the holder shifting the shaft rearwardly, and said shifting mechanism including means to hold the work in position within the holder prior to the shifting of the holder towards the tap or bit operating shaft.

3. A nut tapping machine comprising a bodily shiftable work holder provided with means for the gravity feed of the work to be operated on, a longitudinally shiftable tapper bit operating shaft shiftable rearwardly by said work holder, a longitudinally shiftable supporting shaft mounted on the rear end of said bit operating shaft, a spring controlled work holder shifting mechanism having an element thereof extending into the holder for holding the work therein in position to be operated on and for shifting the holder to and from said bit operating shaft, means cooperating with said bit operating shaft for driving it in an anti-clockwise direction when shifted forwardly by the engagement of the bit with the work and in a clockwise direction when shifted rearwardly by said holder, means mounted on said supporting shaft for operating said shifting mechanism to move the holder towards the bit operating shaft and further to provide for the holder shifting the shaft rearwardly, and means arranged in the path of the holder when the latter is shifted towards the bit operating shaft for discharging the completed work from the holder.

4. A nut tapping machine comprising a bodily shiftable work holder provided with means for the gravity feed of the work to be operated on, a longitudinally shiftable tapper bit operating shaft shiftable rearwardly by said work holder, a longitudinally shiftable supporting shaft mounted on the rear end of said bit operating shaft, a spring controlled work holder shifting mechanism having an element thereof extending into the holder for holding the work therein in position to be operated on and for shifting the holder to and from said bit operating shaft, means cooperating with said bit operating shaft for driving it in an anti-clockwise direction when shifted forwardly by the engagement of the bit with the work and in a clockwise direction when shifted rearwardly by said holder, and means mounted on said supporting shaft for operating said shifting mechanism to move the holder towards the bit operating shaft and further to provide for the holder shifting the shaft rearwardly, that element of said shifting mechanism extending into the holder being in the form of a presser-foot provided with an axial bore.

5. A nut tapping machine comprising a bodily shiftable work holder provided with means for the gravity feed of the work to be operated on, a longitudinally shiftable tapper bit operating shaft shiftable rearwardly by said work holder, a longitudinally shiftable supporting shaft mounted on the rear end of said bit operating shaft, a spring controlled work holder shifting mechanism having an element thereof extending into the holder for holding the work therein in position to be operated on and for shifting the holder to and from said bit operating shaft, means cooperating with said bit operating shaft for driving it in an anti-clockwise direction when shifted forwardly by the engagement of the bit with the work and in a clockwise direction when shifted rearwardly by said holder, means mounted on said supporting shaft for operating said shifting mechanism to move the holder towards the bit operating shaft and further to provide for the holder shifting the shaft rearwardly, and means for limiting the movement of the work holder in a direction towards said bit operating shaft.

6. A nut tapping machine comprising a bodily shiftable work holder provided with means for the gravity feed of the work to be operated on, a longitudinally shiftable tapper bit operating shaft shiftable rearwardly by said work holder, a longitudinally shiftable supporting shaft mounted on the rear end of said bit operating shaft, a spring controlled work holder shifting mechanism having an element thereof extending into the holder for holding the work therein in position to be operated on and for shifting the holder to and from said bit operating shaft, means cooperating with with said bit operating shaft for driving it in an anti-clockwise direction when shifted forwardly by the engagement of the bit with the work and in a clockwise direction when shifted rearwardly by said holder, means mounted on said supporting shaft for operating said shifting mechanism to move the holder towards the bit operating shaft and further to provide for the holder shifting the shaft rearwardly, and said shifting mechanism including means to hold the work in position within the holder prior to the shifting of the holder towards the tap or bit operating shaft, and means for limiting the movement of the work holder in a direction towards said bit operating shaft.

7. A nut tapping machine comprising a bodily shiftable work holder provided with means for the gravity feed of the work to be operated on, a longitudinally shiftable tapper bit operating shaft shiftable rearwardly by said work holder, a longitudinally shiftable supporting shaft mounted on the rear end of said bit operating shaft, a spring controlled work holder shifting mechanism having an element thereof extending into the holder for holding the work therein in position to be operated on and for shifting the holder to and from said bit operating shaft, means cooperating with said bit operating shaft for driving it in an anti-clockwise direction when shifted forwardly by the engagement of the bit with the work and in a clockwise direction when shifted rearwardly by said holder, means mounted on said supporting shaft for operating said shifting mechanism to move the holder towards the bit operating shaft and further to provide for the holder shifting the shaft rearwardly, means arranged in the path of the holder when the latter is shifted towards the bit operating shaft for discharging the completed work from the holder, and means for limiting the movement of the work holder in a direction towards said bit operating shaft.

8. A nut tapping machine comprising a bodily shiftable work holder provided with means for the gravity feed of the work to be operated on, a longitudinally shiftable tapper bit operating shaft shiftable rearwardly by said work holder, a longitudinally shiftable supporting shaft mounted on the rear end of said bit operating shaft, a spring controlled work holder shifting mechanism having an element thereof extending into the holder for holding the work therein in position to be operated on and for shifting the holder to and from said bit operating shaft, means cooperating with said bit operating shaft for driving it in an anti-clockwise direction when shifted forwardly by the engagement of the bit with the work and in a clockwise direction when shifted rearwardly by said holder, means mounted on said supporting shaft for operating said shifting mechanism to move the holder towards the bit operating shaft and further to provide for the holder shifting the shaft rearwardly, that element of said shifting mechanism extending into the holder being in the form of a presser-foot provided with an axial bore, and means for limiting the movement of the work holder in a direction towards said bit operating shaft.

In testimony whereof, I affix my signature hereto.

BERTIS F. HAMILTON.